United States Patent
Kocherovsky et al.

(10) Patent No.: US 6,409,435 B1
(45) Date of Patent: Jun. 25, 2002

(54) CUTTING TOOL AND METHOD OF LOCATING CUTTING INSERT

(75) Inventors: Yevgeny Kocherovsky, W. Bloomfield; Lee Reiterman; Foye Powell, both of Troy, all of MI (US); Edward Santimaw, Anderson, SC (US)

(73) Assignee: Valenite Inc., Madison Heights, MI (US)

( * ) Notice: Subject to any disclaimer, the term of this patent is extended or adjusted under 35 U.S.C. 154(b) by 52 days.

(21) Appl. No.: 09/609,522

(22) Filed: Jul. 3, 2000

(51) Int. Cl.⁷ .............................................. B23B 29/04
(52) U.S. Cl. ........................ 407/104; 407/107; 407/112; 407/109
(58) Field of Search ................................. 407/107, 105, 407/104, 103, 102, 112, 111, 120

(56) References Cited

U.S. PATENT DOCUMENTS

| | | | |
|---|---|---|---|
| 3,299,491 A | 1/1967 | Hall | |
| 3,577,618 A | * 5/1971 | Cashman | 407/104 |
| 3,694,880 A | * 10/1972 | Wolf | 407/45 |
| 3,813,746 A | 6/1974 | Price | |
| 3,813,747 A | * 6/1974 | Hertel | 407/105 |
| 3,829,943 A | * 8/1974 | Bartoszevicz et al. | 407/71 |
| 3,837,058 A | 9/1974 | Barkley et al. | |
| 3,911,543 A | 10/1975 | Sorice | |
| 4,028,782 A | 6/1977 | Stansak | |
| 4,066,376 A | * 1/1978 | Eckle et al. | 407/101 |
| 4,220,428 A | * 9/1980 | Suzuki | 407/105 |
| 4,243,348 A | * 1/1981 | Paige | 408/186 |
| 4,244,666 A | 1/1981 | Erickson et al. | |
| 4,420,280 A | 12/1983 | Gustafson | |
| 4,462,725 A | 7/1984 | Satran et al. | |
| 4,477,212 A | 10/1984 | Kraft | |
| 4,480,950 A | 11/1984 | Kraft et al. | |
| 4,509,886 A | 4/1985 | Lindsay | |
| 4,525,110 A | 6/1985 | Stojanovski | |
| 4,632,606 A | 12/1986 | Lagerberg | |
| 4,714,384 A | 12/1987 | Lagerberg | |
| 4,778,311 A | 10/1988 | Niemi | |
| 5,035,544 A | 7/1991 | Ikenaga et al. | |
| 5,586,844 A | 12/1996 | Nyman | |
| 5,658,100 A | 8/1997 | Deiss et al. | |
| 5,682,803 A | 11/1997 | Boianjiu | |
| 5,931,613 A | 8/1999 | Larsson | |

FOREIGN PATENT DOCUMENTS

| | | |
|---|---|---|
| CA | 1042645 | 11/1978 |
| EP | 0730926 A1 | 9/1996 |
| GB | 844753 | 8/1960 |
| JP | 357102723 A | 6/1982 |

* cited by examiner

*Primary Examiner*—Henry Tsai
(74) *Attorney, Agent, or Firm*—Mary K. Cameron; John W. Gregg

(57) ABSTRACT

An indexable insert is located on a toolholder with reference to bearing surfaces on the insert and the toolholder which are proximate to the active cutting edge. These bearing surfaces are internal to the peripheral (side) flanks of the insert. Location of the insert in the toolholder is substantially independent of the relation between the toolholder pocket sidewalls and the peripheral flanks of the insert, thereby eliminating sources of error from insert manufacture and pocket manufacture. The insert and toolholder have locating units disposed thereon adapted to matingly engage each other when the insert is placed in the toolholder. At least one of the locator elements has a bearing surface or surfaces that extends through 360° and resulting in less movement of the insert during use.

20 Claims, 5 Drawing Sheets

CUTTING TOOL AND METHOD OF LOCATING CUTTING INSERT

FIELD OF THE INVENTION

The invention relates to cutting tools and, in particular, to cutting inserts and toolholders therefor that effect location of the insert at a selected position on the toolholder with improved accuracy and reliability, and a method of locating such inserts. More particularly, the invention provides inserts and toolholders wherein the inserts are located in the toolholder using reference surface or surfaces close to the active cutting edge and substantially independent of contact between the flanks of the insert and the toolholder.

BACKGROUND OF THE INVENTION

In the cutting tool industry, it is a conventional practice to use cutting toolholders, e.g. mills, drills, lathes, reamers, bores, cutters, blades and other known cutting devices, having replaceable cutting inserts of hard wear resistant material releasably secured thereto. The toolholders are manufactured with recesses or pockets therein, to hold and support the cutting insert, either alone or coupled with an insert-holding cartridge. Generally, the insert has multiple cutting edges or cutting edge portions and only one or two of them are put in contact with the workpiece at any one time. The cutting edge or edges positioned in the toolholder to contact the workpiece are referred to as active cutting edges. In this manner, when the active cutting edges of the insert become dull or the insert otherwise fails, the less expensive insert is indexed to an unused cutting edge which becomes "active" or replaced rather than replacing or repairing an entire tool.

The use of inserts has provided cost savings in materials and labor, as well as allowing use of materials for the cutting insert that are different from the toolholder material. However, the use of replaceable inserts has also created challenges in positioning the insert uniformly, accurately and repeatably in the toolholder in a selected orientation, that is, to locate the insert. Another challenge presented by insert use is to limit movement of the insert relative to the toolholder during use. Location is critical to overall tool performance including the tolerances that can be maintained, reliability of the tool, down time and tool life. Historically, cutting edges integral with a cutting tool, such as the teeth on a hand saw, had a fixed position relative to the tool body and movement of the cutting edge was limited by characteristics of the tool material. The use of inserts as individual parts of a cutting tool, separate from the toolholder, introduced new variables that contribute to inaccuracy in positioning of the active cutting edge. Variables that affect position of the active cutting edge in the toolholder include, but are not limited to, variations in size or shape from insert to insert, variations in the distance between features on the same insert, variations in geometrical forms on the insert, variations in toolholder pocket sidewalls and position of the pocket. Use of inserts also increased the potential for movement of the insert (and hence the cutting edge) relative to the toolholder during use.

Locating an insert involves positioning the insert at a selected location on the toolholder, relative to the x, y and z axes of three-dimensional space, and during use the insert's movement on these axes, translationally and rotationally, relative to the toolholder should approach zero. Additionally, in order to maintain accuracy of a cutting process when a used cutting edge is changed for an unused edge, it is desirable that the user be able to position the insert in the toolholder such that the unused cutting edge is located in nearly the identical place in relation to the toolholder and workpiece as was the former cutting edge. This challenge is multiplied when a tool holds more than one insert since the inserts' positions in the pockets relative to each other also affect cutting. Various known holding means, such as screws and clamps, are used in the industry to secure cutting inserts in toolholders. Heretofore, holding means have been used in conjunction with the sidewalls of the pockets in the toolholder to locate the insert.

Conventionally, an insert positioned in a toolholder has bottom and flank (side) surfaces in contact with the pocket walls, and has at least one cutting edge that is formed by intersection of the top surface with the flanks. A portion of the cutting edge extends beyond the toolholder for contacting the workpiece. The sidewalls of the toolholder pockets are routinely utilized as locating surfaces for the insert. Users push inserts into toolholder pockets until the insert flanks proximate to the pocket sidewalls abut the sidewalls along at least a portion of the flank length. The insert is then releasably secured, with the flanks abutting toolholder pocket sidewalls, by a holding means. In this conventional locating method, the insert flanks determine the position of the insert, relative to the toolholder, by contact between the insert flanks proximate to the pocket sidewalls and the pocket sidewalls, and thereby dictate the position of the active cutting edges on the portion of the insert extending beyond the toolholder. The pocket sidewalls also support the insert and are designed to prevent it from moving out of the selected position due to forces generated by contact with the workpiece. That is, in the prior art, the flanks of the insert and the pocket sidewalls are used to locate the insert. A disadvantage of prior art locating means has been inaccurate location of the active cutting edge of the insert in relation to the workpiece. U.S. Pat. No. 3,813,746 to Price recognized problems that prior art cutting tools have with insert location, noting that as a practical matter, cutting edges will not always be located at exactly the same position in relation to the holder. Price discloses a locking pin used to wedge an insert flank against a toolholder pocket sidewall and seeks to limit variation in cutting edge position by inclining the pocket sidewall to reduce forward and rearward insert displacement. Heretofore other attempts have been made to reduce or eliminate positioning variables, including the following:

U.S. Pat. No. 3,911,543 to Sorice discloses an elongated cutting insert with a locating pin. The insert engages the rear, side and bottom wall of the toolholder pocket.

U.S. Pat. No. 4,028,782 to Stansak discloses an insert having notches in upper and lower surfaces which correspond to the toolholder pocket. Precision indexing is accomplished by indexing surfaces positioned on the flanks of the insert.

U.S. Pat. No. 4,244,666 to Erickson et al. discloses a locking pin that tilts to locate the insert against the back wall of the toolholder pocket.

U.S. Pat. No. 4,420,280 to Gustafson discloses a toolholder with a locking pin on an insert holder engaging the central hole of an insert and a clamping wedge which moves the insert holder. The clamping wedge engages the insert holder thereby moving the locking pin and insert and locating the insert by abutment of the insert flank with a stop on the toolholder. Spring means push the insert away from the stop when the clamp is released.

U.S. Pat. No. 4,525,110 to Stojanovski discloses ball nose end mill inserts having recesses which are acted upon by protuberances on a cap to locate the insert against a toolholder pocket sidewall.

U.S. Pat. No. 5,035,544 to Ikenaga et al. U.S. Pat. No. 3,837,058 to Barkley et al., and U.S. Pat. No. 5,586,844 to Nyman disclose various examples of a toolholder with a locking pin which engages the central hole of an insert and a clamping wedge attached to the toolholder by a screw. A rear end of the clamping wedge assembly engages an inclined supporting surface and a front end of the clamping wedge assembly engages the insert flank. Location of the insert on the pin is made by the wedge with reference to the insert flank. U.S. Pat. No. 5,682,803 to Boianjiu discloses an insert or shim having a pattern of protrusions designed to indent the flat toolholder pocket when a clamp secures the insert to prevent movement during use. The insert may have a protrusion, which fits a recess in the shim.

The foregoing prior art attempts to secure inserts still have drawbacks associated with using insert flanks and toolholder pockets as reference surfaces for locating the active cutting edge, and provide inaccurate cutting edge location.

Another drawback in conventionally locating prior art inserts in toolholders has been inability to maintain the position of the cutting edge, and therefore the workpiece finish, to within desired tolerances in a given size insert. It is known in the industry that, as the distance between the locating surface and the active cutting edge increases, the difficulty of maintaining that distance to within a selected tolerance during insert manufacture increases. This phenomenon is recognized in manufacturing standards and grades of precision. For example, DIN standard 7160 DY5 qualifies articles of various dimensions as having met the "h7" grade of precision based upon the tolerances that the article holds. However, the margin for error gets larger as the size of the part increases. Comparing two articles that meet the "h7" grade, a 100 mm long article and a 10 mm long article, shows that the tolerances required are not the same. The larger article meets the "h7" grade provided it is within ±17.5 microns of the desired dimension. The smaller article must hold more stringent tolerances of ±7.5 microns to achieve the same "h7" grade of precision. This manufacturing standard, and others, recognize that it is more difficult to maintain a selected tolerance, of "±x" units of measurement, on a dimension as the size of the dimension increases. Due to this phenomenon, the greater the length dimension (distance) between the locating surface on the insert and the cutting edge being located (active cutting edge), the more difficult it is to maintain the location of the cutting edge to a selected tolerance. This is a major disadvantage of the prior art location means, which typically locate the insert using the insert flanks farthest away from the cutting edge being located. The distance between the active cutting edge and the flank of the insert distant from the cutting edge is dictated by the size of the insert, which is often not amenable to a different selection. Applicants' invention reduces this inaccuracy by placing the insert locating units close to the cutting edge being located, and is independent of insert size.

During use of a cutting tool, movement of the cutting insert in relation to the toolholder introduces another source of inaccuracy. For example, "insert rise" is characterized by movement of the insert in relation to the pocket walls. This movement is caused by forces exerted on the insert when it contacts the workpiece. It is known in the industry that the forces exerted on an insert in a toolholder during cutting act to move the insert in one or more of six degrees of freedom of movement of the insert. The six degrees of freedom designate the six possible types of directional movement that can be imparted to an object, such as an insert, when a force is exerted thereon, and correspond to translational or rotational movement in relation to the conventional x, y, z axes that describe three dimensional space. In the prior art, attempts are made to limit the degrees of freedom of movement of the insert by locating the insert against the toolholder pocket floor and one or more sidewalls, and then securing the insert with a clamp or other holding means. However, inaccuracies in positioning the active cutting edge and in movement of the insert during use remain in conventional cutting tools.

Yet another disadvantage of the prior art has been the need for precision machining of the toolholder pockets. Since the floor and usually two sidewalls are used to locate the insert, all three of these surfaces must be precisely machined to avoid irregularities such as incorrect angular relationships, improper pocket size and surface irregularities all of which can change the position of the insert relative to the workpiece either during use or when the insert is exchanged for a new one. The precision required of the toolholder pockets results in increased costs for the design and manufacture of toolholders. Particularly where the pocket geometry is complex or difficult to machine, creating a pocket or series of pockets having sidewalls in precise relation to each other and the tool body is costly and time consuming. Even precision machined pockets do not achieve the tolerance requirements for some machining applications.

The foregoing drawbacks in conventional location devices have been recognized in he industry. Prior art attempts to use location means other than the pocket sidewall have resorted to adding parts external to the insert periphery which contact the insert flanks, thereby perpetuating inaccuracies attributable to variations in the insert. U.S. Pat. No. 4,632,606 to Lagerberg discloses a localization pin that contacts a hole in a cutting insert on two separate centering surfaces. The flanks of the insert abut support surfaces on a plate attached to the toolholder and slide along these surfaces until the localization pin is wedged in the insert hole, thereby locating with reference to the insert flanks. U.S. Pat. No. 4,714,384 to Lagerberg discloses a toolholder with a locking pin which engages a hole of an insert and a two part clamping assembly attached to the toolholder. The clamping assembly engages the insert flanks pushing the insert onto the pin. These designs continue to use the insert flanks as a reference and have the drawback of making the tool larger and heavier. Increased size in a cutting tool can interfere with certain cutting operations. Further, the heavier the tool becomes, the greater the forces that are exerted on the insert when the tool is in motion and the greater the dynamic inaccuracy of the location of the cutting edge. The prior art attempts often decrease accuracy due to numerous movable parts external to the periphery of the insert and may exhibit tool imbalances. Another disadvantage of several of the prior art location devices has been limited capability to withstand the extreme forces generated on the cutting tool. As machine tools achieve higher revolution per minute capabilities and speeds and feed rates are increased, heavy tools and those having numerous movable parts become more undesirable.

Applicants have developed a new cutting insert and toolholder geometry that provides excellent locating accuracy and simplicity of manufacture, and a method of locating a cutting insert in a toolholder employing the new geometries which overcome the foregoing disadvantages.

BRIEF SUMMARY OF THE INVENTION

It is an object of the present invention to provide an insert, toolholder, cutting tool and method of locating an insert, which overcome the disadvantages of the prior art. It is, therefore, an object of this invention to provide an insert and toolholder design which provides excellent accuracy and reliability in locating the insert in a tool body or holder. A more particular object of the invention is to provide a method for uniformly, accurately and repeatably locating an insert in a tool body or holder in a selected orientation.

It is an object of the invention to provide a new method and features for locating the insert in the toolholder with greater uniformity, accuracy and repeatability, and limit the insert's freedom of movement during use. A further object of the invention is to provide mating engagement of locating units having a bearing surface or surfaces extending through 360°.

It is an object of the invention to provide an improved cutting tool having an insert or inserts located in a toolholder substantially independent of contact between the toolholder pocket sidewalls and the insert flanks.

It is an object of the invention to provide an improved cutting tool with locating units, in particular moving parts thereof, internal to the toolholder body and insert body during use. It is a further object of the invention to provide an insert locating unit, in particular the locator elements and bearing surfaces thereof that are internal to the peripheral flanks and top surface of the insert being located.

It is another object of the invention to provide an insert that is located by one or more bearing surfaces during manufacture and located by the same bearing surface or surfaces in the use environment.

It is an object of the invention to increase the precision of locating inserts by reducing the distance between the locating surfaces, such as the bearing surface or surfaces, and the active cutting edge being located thereby improving tolerances which can be met. It is also an object of the invention to increase the precision of locating the active cutting edge of larger inserts by eliminating the effect of the increase in insert size on tolerances that can be met by locating without reference to the opposite flank.

Applicants' invention also relates to a method of locating a cutting insert in a toolholder by positioning an insert having a first locating unit in aligned relation with a toolholder having a second locating unit adapted to mate with the first locating unit, the first locating unit comprising at least one stationary locator element and the second locating unit comprising at least one toolholder locator element, such that one of the stationary locator elements is matingly engagable with one of the toolholder locator elements, matingly engaging the first and second locating unit and exerting force on one of the locating unit whereby the insert's location in the toolholder is determined by abutment of selected bearing surface or surfaces of the first and second locating unit, and substantially independent of insert flank position.

It is an object of the invention to provide a cutting tool having a toolholder with an insert receiving region having an insert receiving seat, and a cutting insert securable within the region having a first locating unit disposed on the insert body, the first locating unit comprising first and second stationary locator elements disposed on at least one of the surfaces, the first stationary locator element positioned proximate a cutting edge to be located, as well as a second locating unit disposed in the insert receiving region, the second locating unit comprising first and second toolholder locator elements, at least one of the toolholder locator elements being adapted to matingly engage at least one of the stationary locator elements, the locator elements comprising bearing surfaces. The tool also has a tensioning device for urging bearing surface on one of the toolholder locator elements into abutment with the bearing surface of the first stationary locator element.

It is another object of the invention to provide a tool having a toolholder having a toolholder body comprising an insert receiving region having an insert receiving seat, a toolholder locating unit disposed in the insert receiving seat; an insert having a body defined by a top surface, a bottom surface and at least one flank extending therebetween, and at least one cutting edge formed by intersection of one of the flanks and one of the surface or surfaces, the insert being releasably secured on the insert receiving seat, an insert locating unit disposed on one of the surface or surfaces and adapted to matingly engage the toolholder locating unit; and a tool periphery, that is an outline or profile of the tool, formed by combining outlines of the insert receiving region and the insert, the toolholder locating unit and the insert locating unit being encompassed by the tool periphery, whereby the locating units lie internal to the bodies.

It is a further object of the invention to provide a toolholder for holding a cutting insert, having a toolholder body and an insert receiving region comprising an insert receiving seat for contacting the bottom surface and a toolholder locating unit for matingly engaging the insert locating unit; the insert receiving seat having a distal portion for supporting the active cutting edge during use; the toolholder locating unit comprising a first toolholder locator element disposed on the distal portion and having reference bearing surface or surfaces for abutting first insert locator element bearing surface or surfaces proximate the active cutting edge; and a second toolholder locator element for engaging a second insert locator element and having second bearing surface or surfaces for contacting second insert locator element bearing surface or surfaces; one of the first and second toolholder locator elements being movable in relation to the toolholder body for urging the first insert locator element bearing surface or surfaces against the first toolholder locator element bearing surface or surfaces; and a tensioning device for moving one of the first and second toolholder locator elements.

It is another object of the invention to provide a toolholder for holding a cutting insert, comprising an insert receiving seat for contacting the bottom surface of an insert, the seat having a distal end for supporting an insert cutting edge during contact between the cutting edge and a workpiece, and a locating unit for locating the insert on the seat substantially independent of contact between the insert flanks and the toolholder, the locating unit comprising a toolholder stationary locator element for mating engagement with a stationary locator element positioned on the insert bottom surface, the toolholder stationary locator element positioned on the distal end, a movable locator element for bringing bearing surface or surfaces on the stationary locator elements into mutual abutment and a tensioning device for actuating the movable locator element.

It is also an object of the invention to provide a cutting insert of hard wear resistant material releasably securable in a toolholder comprising a top and bottom surface or surfaces, at least one flank extending therebetween, a cutting edge formed by intersection of the at least one flank and the top surface, at least a portion of the cutting edge being an active cutting edge during use, an insert locating unit for engaging a toolholder locating unit disposed on the toolholder, comprising a plurality of locator elements disposed on the surface or surfaces and internal to the at least one flank, at least one of the locator elements positioned proximate the active cutting edge and adapted to matingly engage a toolholder locator element positioned in an insert receiving region of a toolholder, bearing surface or surfaces on the locator elements for contacting adjacent bearing surface or surfaces on the toolholder locating unit during mating engagement in response to forces exerted by a tensioning device on the toolholder, thereby locating the active cutting edge substantially independent of contact between the at least one flank and the toolholder.

It is a yet further object of the invention to provide a cutting insert wherein the locator elements comprise bores for matingly engaging pins on a toolholder and bearing surface or surfaces circumscribing the bore for frictionally limiting rotational and translational movement of the insert.

BRIEF DESCRIPTION OF THE DRAWINGS

The invention will be more closely described hereinafter in connection with the appended drawings.

DETAILED DESCRIPTION OF THE INVENTION

The present invention relates to a cutting tool that provides more accurate and reliable cutting operations through use of a new method and device for locating inserts in a toolholder. More particularly, the invention provides inserts, toolholders, and a method of accurately locating an insert in the toolholder in a selected orientation that results in positioning of the active cutting edge, in relation to the toolholder and workpiece, that is uniform and repeatable when changing cutting edges or inserts. The present invention provides the foregoing and other advantages by locating the active cutting edge of the insert with reference to bearing surface or surfaces on the insert and the toolholder which are proximate the active cutting edge. These bearing surfaces are internal to the peripheral (side) flanks of the insert. Location of the insert in the toolholder is substantially independent of the relation between the toolholder pocket sidewalls and the peripheral flanks of the insert, thereby eliminating disadvantages of prior art locating methods and devices. During manufacture the flanks of inserts of the invention can be ground using the bearing surfaces as reference points in securing the insert. In this manner, the same surface that serves as a reference point during manufacture of the cutting edge acts as the reference point for location of the cutting edge during use. Utilizing the bearing surface or surfaces of the invention, internal to the flanks, as reference points during manufacture eliminates errors inherent in prior art inserts which are ground during manufacture with reference to a flank which is then itself ground thereby destroying the reference point. Manufacture of toolholders of the invention is simplified by eliminating the need for precisely made pocket sidewalls. Boring holes is inherently simpler and easier and eliminates runout.

The insert and toolholder have locating units disposed thereon adapted to matingly engage each other when the insert is placed in the toolholder. Each locating unit is comprised of one or more locator elements possessing bearing surface or surfaces. The bearing surface or surfaces comprise points, lines or planes of contact, or combinations thereof, between the matingly engaged locating units. During use, the bearing surfaces of both the insert and toolholder locator elements are positioned internal to the insert body or the toolholder body thereby eliminating external moving parts. Bearing surface or surfaces proximate the active cutting edge serve as reference surface or surfaces for location of the active cutting edge. At least one of the locator elements has a bearing surface or surfaces that extends through 360° and limits movement of the insert in the plane of the insert receiving seat of the toolholder. In a preferred embodiment, the six degrees of freedom of movement of the insert in relation to the toolholder are limited. That is, contact between the bearing surfaces on the insert and toolholder limits the translational and rotational movement of the insert in relation to the x, y and z axes. Position of the points, lines or planes of contact, or combinations thereof, between the bearing surfaces on the insert and toolholder may change during use depending on the forces exerted on the active cutting edge.

The locating unit disposed upon the insert, hereinafter the insert locating unit, comprises at least one stationary locator element proximate a corresponding cutting edge to be located. In a preferred embodiment, the insert locating unit comprises a plurality of stationary locator elements. Preferably, at least one locator element is disposed on the insert proximate to each cutting edge of the insert. Positioning a locator element that will act as the reference for location of a particular cutting edge proximate that cutting edge greatly improves the tolerances that can be met in locating the insert. In a preferred embodiment, a stationary locator element is positioned on the bottom of the insert proximate a flank that intersects the insert top surface forming the active cutting edge thereby. In this manner, the locator elements are positioned internal to the cutting tool periphery avoiding the drawbacks of the prior art.

Toolholders suitable for use in the present invention include devices having an insert receiving region, such as a pocket, cartridge or the like. In the prior art, the insert receiving region includes a floor and sidewalls against which the insert is located and then secured. Toolholders of the present invention have an insert receiving region with an insert receiving seat at the distal end thereof, and optionally sidewalls. However, location of the insert is accomplished in the present invention substantially independent of the sidewalls of the insert receiving region. In a preferred embodiment, the insert is located completely independent of the toolholder pocket sidewalls.

Toolholders of the instant application locate the insert by means of a locating unit, disposed in the insert receiving region of the toolholder, hereinafter the toolholder locating unit, matingly engaging the insert locating unit. The toolholder locating unit comprises one or more locator elements. A first toolholder locator element is disposed in the insert receiving region near the distal end of the insert receiving seat proximate the position of the active cutting edge of the insert during use. This first toolholder locator element has bearing surface or surfaces that comprise reference surfaces for locating the insert. In a preferred embodiment, the toolholder locating unit comprises a stationary locator element and a movable locator element. It is preferred that the locator element proximate the distal end of the insert receiving seat is stationary. The locator elements are disposed on the toolholder in a manner which allows mating engagement of at least one of the toolholder locator elements closest to the distal end of the insert receiving seat with an insert locator element proximate the active cutting edge when the insert is placed in the toolholder for use.

This mating engagement limits translational movement along the x, y, and z axes. The toolholder has a tensioning device, which may be integral with the toolholder or comprised of a separate part or parts positioned on or within the toolholder body depending upon the embodiment. The tensioning device exerts a force that causes the matingly engaged locator elements of the insert and toolholder to abut at respective bearing surfaces. The tensioning device may be a spring, cam, screw or other similar known devices. It is preferred that the force or a resultant vector of the force exerted by the device draws the insert into the toolholder pocket. The tensioning device that may be any suitable device that exerts a selected translational force on the moveable locator element and may be integral with the locator element. The force exerted by the tensioning device causes movement of the movable locator element, bringing bearing surfaces on the insert and toolholder into contact thereby locating the insert relative to the toolholder. The translational force is selected to be of a magnitude at least great enough to cause bearing surfaces to abut, but less than that which would cause failure of the toolholder or fracture the insert. The direction of the translational force is selected to act upon the movable locator element such that the bearing surfaces of the insert and toolholder are brought into abutment. In a preferred embodiment, the tensioning device is a coil spring, but other tensioning devices known in the industry such as flexible pins, cams, washer-type spring's flexing slots and the like can be used. In a preferred embodiment, the movable locator element comprises a tensioning device.

For many applications, the force holding the locator elements and their respective bearing surfaces in contact has the same vector direction as major forces exerted on the insert during cutting actions. This creates an additive effect between the force vectors exerted against the substantially inelastic insert, securely locating the insert by contact between the insert locator elements and the toolholder locator elements. Where cutting forces are directed along vectors different from the tensioning force, the mating engagement between the locating units limits the six degrees of freedom of movement of the insert thereby providing improved reliability in insert location.

The invention described herein improves the accuracy of insert location by reducing the distance between the active cutting edge being located and the locating surface thereby reducing the size effect on tolerances. Repeatability of location when changing inserts or cutting edges is also improved in the invention since dimensional differences between inserts and variations in the position of insert features relative to the cutting edge do not affect location. The present invention will become more clear upon consideration of the following embodiments that are intended to be illustrative and not limiting of the scope of the present invention.

Figures 1, 2:
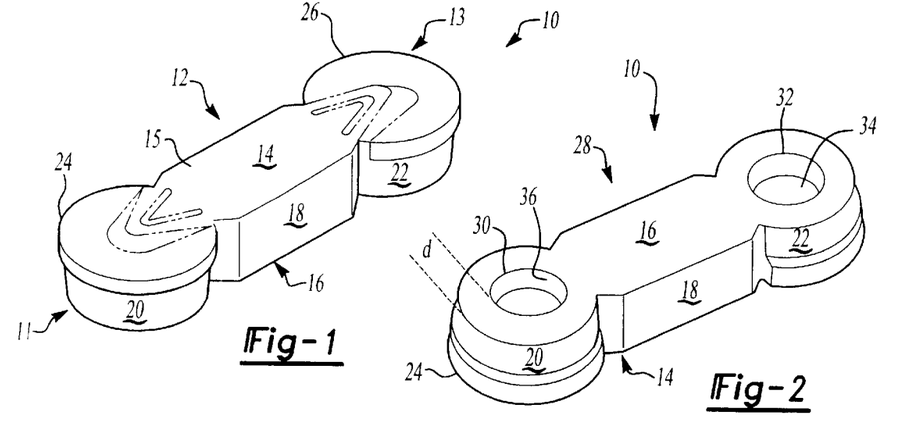
FIG. 1 shows a first embodiment of a cutting insert according to the present invention in perspective view.
FIG. 2 is a bottom perspective view of the cutting insert of FIG. 1.

A preferred embodiment of the present invention is shown in FIG. 1. The indexable cutting insert 10 has a body 12 of hard wear resistant material. The body includes a top surface 14 and a bottom surface 16 connected by a peripheral wall 18 extending therebetween. The body comprises two substantially cylindrical cutting ends 11 & 13 connected by central portion 15 interposed therebetween. Optionally, the body may have a single cutting end 11. The cutting ends of FIG. 1, include flanks 20 and 22, that intersect top surface 14 to form cutting edges 24 and 26, respectively. In FIG. 1, cutting ends 11 & 13 have a substantially cylindrical shape with planar flanks extending substantially parallel to peripheral wall 18. Other cutting end geometries may be used, such as polygon sections, as well as cutting ends having flanks with multiple subsidiary flank portions and other geometries within the knowledge of one ordinary skill in the art that do not interfere with the functioning of the locating units.

FIG. 2 is a perspective view of the bottom of the insert of FIG. 1 showing important features of the present invention. The bottom surface 16 of the insert is substantially planar. While this planar feature provides ease of manufacture, optionally a more complex geometry, such as multiple planes, or a non-planar bottom surface may be employed with the invention provided that it does not interfere with location according to the invention. An insert locating unit 28 is disposed on bottom surface 16. Insert locating unit 28 comprises at least one stationary locator element, and is adapted to matingly engage a toolholder locating unit of the present invention, as will be hereinafter described. In this embodiment, stationary locator elements 30 and 32 are integral with the insert body 12. Each stationary locator element is disposed proximate a corresponding flank 20 and 22, which forms a respective cutting edge 24 and 26 by intersection with top surface 14. In an alternative embodiment, additional cutting edges may be formed by intersection of flanks 20 and 22 with bottom surface 16. In the alternative embodiment, a second set of insert locator elements is disposed on top surface 14 for locating the additional cutting edges or locator elements 30 and 32 may be extended to intersect the top surface 14, forming a through and through opening.

The locator element 30 is disposed on the insert bottom surface 16 at a distance "d" from flank 20 selected to minimize the distance between cutting edge 24 and locator element 30 while retaining sufficient material therebetween to support the cutting edge and reduce the likelihood of fracture of the insert in the area of the locator element. The required thickness of material remaining between flank 20 and the nearest locator element 30 is a function of the material used, generally a hard wear resistant nitride, carbide or ceramic. The amount of material, and hence the least distance between cutting edge 24 and locator element 30, is determined based upon the strength and stress condition of the insert material. It is within the knowledge of one of ordinary skill in the art to determine the minimum material between the cutting edge and the locator element sufficient to withstand cutting forces while still providing desired benefits of the instant invention.

The distance between the flanks 20 and 22 and the centers of the locator elements 30 and 32, respectively, is approximately equal to one radius of the cutting ends 11 and 13. Preferably a stationary locator element is positioned a maximum of 40% of the length of the insert away from the cutting edge or edges to be located using that locator element as a reference or from the flank or flanks proximate thereto, more preferably 30% or less. Positioning the reference locator element close to the flank nearest the cutting edge being located reduces the distance between the bearing surfaces used as reference surfaces in location and the cutting edge. Decreasing this distance enables manufacturers to hold more precise tolerances and hence improve the accuracy of location of the insert. In FIG. 2, stationary locator elements 30 and 32 are recesses in bottom surface 16, and comprise bearing surfaces 36 extending into the insert body 12 and terminating at floor 34. The stationary locator elements may be created using known manufacturing methods such as pressing, grinding, molding, printing, drilling and the like.

Figures 3, 4:
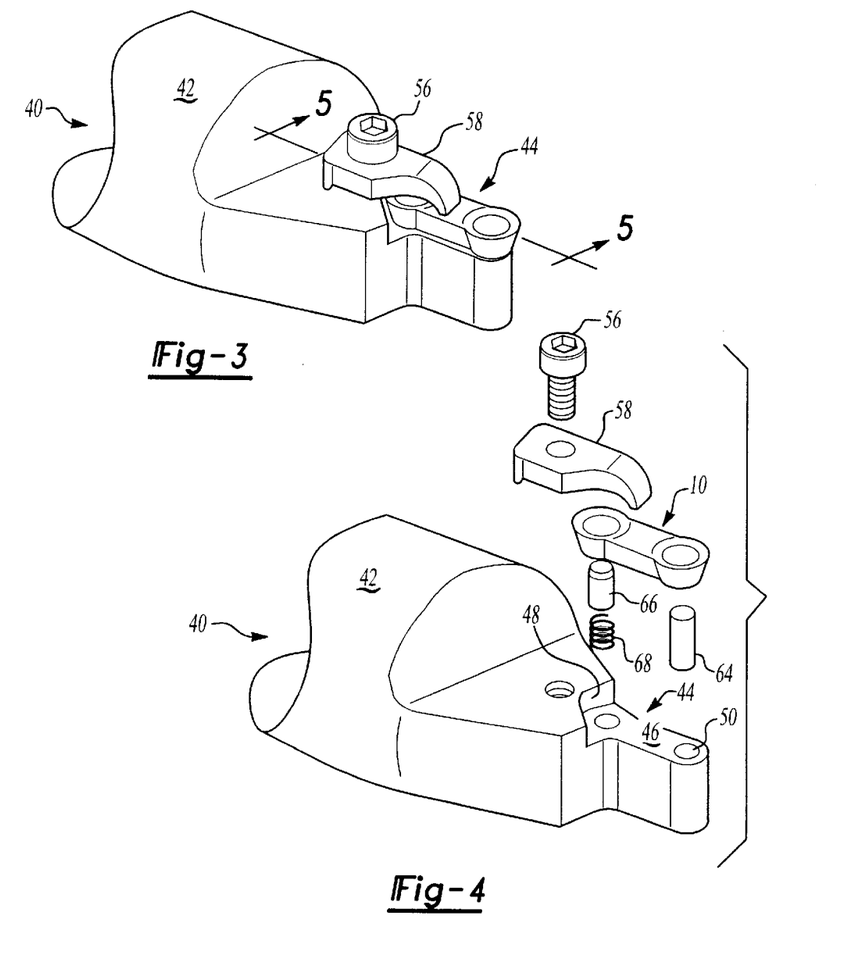
FIG. 3 is a perspective view of the cutting insert shown in FIG. 1 showing the relation with a toolholder of the present invention.
FIG. 4 is an exploded view of FIG. 3.
Figure 5:
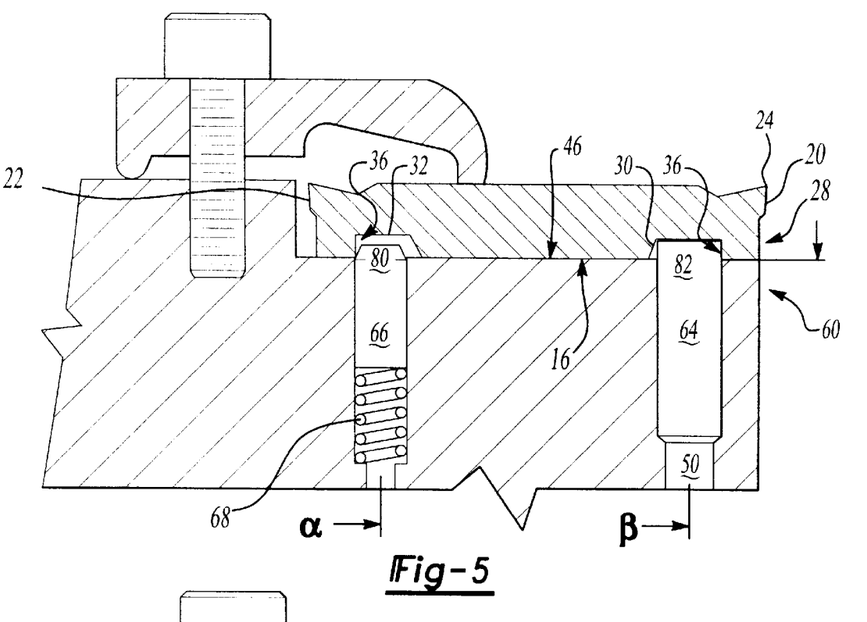
FIG. 5 is a cross-sectional view of the cutting insert and toolholder of FIG. 3, viewed along a bisector line shown by arrows 5—5.

FIG. 3 is a perspective view of a preferred embodiment of a toolholder, with an insert located therein, according to the present invention. The toolholder 40 comprises a toolholder body 42 and an insert receiving region 44. Screw 56 and clamp 58, in FIG. 3, comprise a holding means, but any conventional holding device known in the art, for example shims, cams, wedges and the like, which does not interfere with locating the insert according to the invention, can be used to secure the insert. FIG. 4, an exploded view of FIG. 3, shows the relationship between various features of a toolholder 40 and a cutting insert 10 of the present invention. Insert receiving region 44 includes an insert receiving seat 46 and, optionally, sidewalls 48. Bores 50 penetrate insert receiving seat 46 and extend into the toolholder. The toolholder locating unit of this embodiment comprises toolholder locator elements, as will hereinafter be described, positioned within the bores 50, that extend outward from the insert receiving seat 46 to matingly engage insert locator elements according to FIG. 2 on insert bottom surface 16. FIG. 5 is a cross-sectional view of the cutting insert and toolholder of FIG. 3, showing mating engagement of insert locating unit 28 and toolholder locating unit 60. Bottom surface 16 abuts insert receiving seat 46.

Bores 50 penetrate insert receiving seat 46 and extend into the toolholder. In FIG. 5, the bores extend at angles α and β to insert receiving seat 46 and are perpendicular to both the longitudinal and transverse axes thereof. However, it is within the scope of the invention to provide bores disposed at non-perpendicular angles to one or both of the axes, and bores disposed at angles different from each other, provided that the angles do not interfere with mating engagement. Preferably, bore angles to the longitudinal and transverse axes range between 30° and 90°. The stationary locator elements of the insert are disposed at angles, which facilitate mating engagement with toolholder locator elements positioned within the bores and may be disposed at angles. It is preferred that the insert locator elements are disposed at angles that are substantially the same as those of the corresponding bore, most preferably the same angle. In this embodiment, the toolholder locator elements positioned within bores 50 are a stationary locator element 64 and a movable locator element 66, which are matingly engaged with stationary locator elements 30 and 32, respectively. This mating engagement provides improved restraint on insert movements during cutting operations.

The locator elements of the embodiment shown in FIGS. 3–5 are recesses disposed on the insert bottom 16 and pins positioned in the bores 50. The pins and recesses have shapes which provide for mating engagement, and may have various cross sectional shapes such as, by way of non-limiting example, round, polygonal, oval or combinations thereof, as well as various three dimensional shapes, such as frustroconical, conic, pyramidal or the like, which do not interfere with functioning of the invention. A preferred stationary toolholder locator element, is fixed within the bore by known means such as interference fit. Optionally the stationary toolholder locator element may be integral with the toolholder.

The material of the toolholders can be steel or other material known in the art for use in toolholders. Inserts of the invention are be made of hard, wear resistant materials commonly used in the cutting industry, such as cemented carbide, ceramic, cubic boron nitride, diamond and combinations thereof. The inserts may also be coated, as is known in the industry, with coatings such as ceramic, diamond, c-BN, and carbides, nitrides and carbonitrides of the elements of Group IV, as well as combinations thereof. The insert locator elements may be of the same material as the insert or a different material, for example a lining of another substance may be applied to add lubricity to aid mating engagement. The pins may be of the same material as the toolholder or the insert or of a material different from both.

The movable toolholder locator element 66 is displaceable within its bore in a direction parallel to the element's longitudinal axis with minimal motion perpendicular thereto. The tensioning device 68 exerts a force displacing the movable locator element 66 upward thereby bringing bearing surface 80 into engagement with bearing surface 36 of the stationary locator element 32. In this embodiment, bearing surface 80 comprises a wedge at the top of the movable toolholder locator element. This bearing surface imparts the force of the tensioning device acting on the movable locator element to the insert, creating both horizontal and vertical vector components, and thereby drawing the insert rearwardly, that is into the pocket. The rearward motion of the insert body brings bearing surface 82 of stationary locator element 64 into abutting contact with bearing surface 36 of the stationary locator element 30 closest to the active cutting edge 24. The inelastic nature of the insert material and the fixed position of the stationary locator element 64 provide a stable interface between 64 and 30, which provides uniform and repeatable positioning of the insert. Overall accuracy of location of the active cutting edge 24 is also improved due to the close proximity of locator elements 64 and 30 thereto. The insert flank 22 which would be used in conventional insert location is approximately 6 times further away from the active cutting edge 24 than the insert locator element 30; reducing this distance improves the tolerances that can be met.

To use an insert in the embodiment of FIGS. 1–5, the insert body 12 is positioned in the insert receiving region such that the insert locator elements are aligned with the toolholder locator elements extending from the insert receiving seat. Insert bottom 16 is then brought into contact with the insert receiving seat 46 causing the toolholder locator elements 64 and 66 to engage the insert locator elements. Tensioning device 68 is compressed sufficiently to allow mating engagement of the respective locator elements. Tensioning device 68 is released and pushes movable locator element 66 upward to engage bearing surface 36 of element 32 with bearing surface 80. The wedge of 80 draws the insert into the pocket and causes abutment of bearing surfaces 36 and 82. The method of locating the insert of the invention requires deactuating the tensioning device, matingly engaging the locator elements of the toolholder and insert, and reactuating the tensioning device. Actuating and deactuating the tensioning device can be accomplished by compression, tension, or other force being exerted on the tensioning device that temporarily decreases the tensioning force exerted by the device. For example, in the embodiment of FIGS. 3–5 using a coil spring, the spring 68 is compressed and when the compression is released, the tensioning device locates the insert by bringing bearing surfaces 36 of stationary locator element 30, proximate the cutting edge to be located into contact with bearing surface 82 of the stationary locator element of the toolholder. In a preferred embodiment, the machine operator can simply "snap" the insert into place on the insert receiving seat 46, reducing downtime by making insert changing easier and faster.

Figure 6:
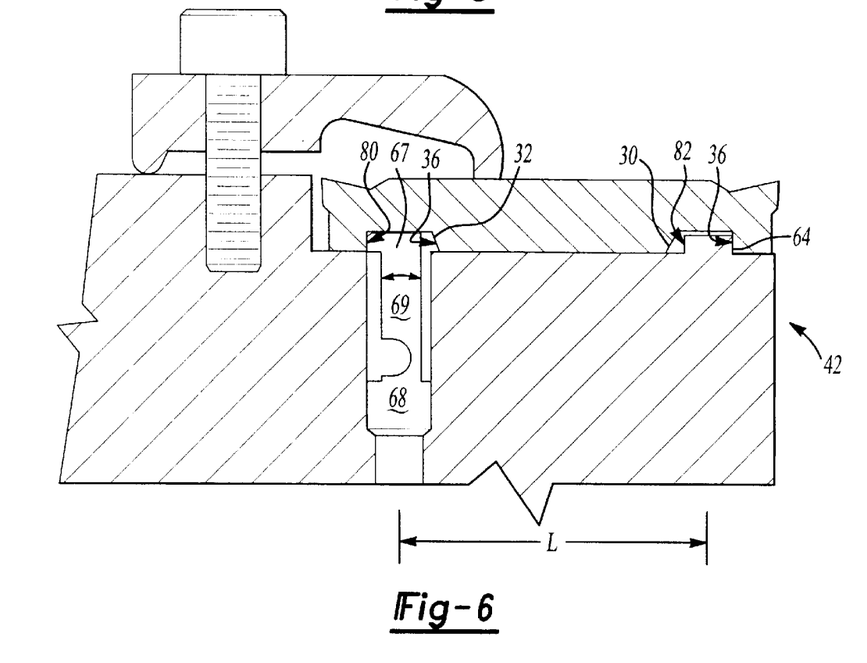
FIG. 6 shows a second embodiment of an indexable cutting insert and toolholder according to the present invention in sectional view, it being understood that a perspective view of this embodiment would be substantially identical to FIG. 3.

FIG. 6 shows a second embodiment of the invention whose external appearance is substantially the same as that shown in FIG. 3, but having different features of the invention, in particular different toolholder locator elements as shown in this crossectional view. The stationary locator element 64 positioned proximate the active cutting edge, is integral with the toolholder body 42. The movable locator element and tensioning device are integrally formed as a resilient spring pin 68. The spring pin head 67 is movable substantially transverse to the longitudinal axis of the pin by flexing the spring pin shank 69. The movement allows mating engagement of the insert and toolholder locator elements, by temporarily decreasing the distance "L" between toolholder locator elements 64 and 68. When flexion is release on the spring pin, bearing surface 80 on spring pin head 67 engages the bearing surface 36 of insert stationary locator element 32 and draws the insert into the toolholder pocket. As a result of this movement, the bearing surface 36 of the stationary insert locator element 30 proximate the active cutting edge is brought into contact with bearing surface 82 of the stationary toolholder locator element 64 locating the insert against this stationary reference point proximate the cutting edge.

Figure 7:
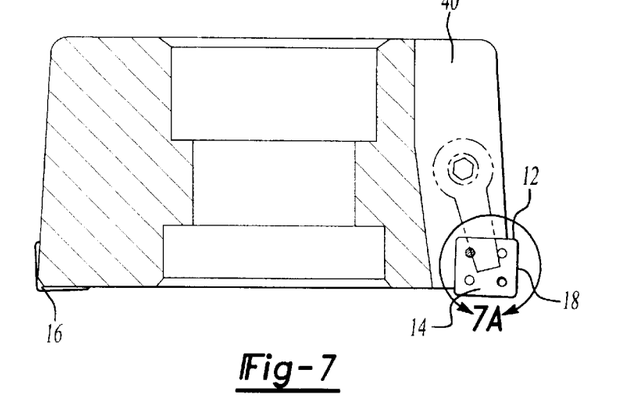
FIG. 7 shows a third embodiment of a cutting insert and milling cutter of the present invention.
Figure 7A:
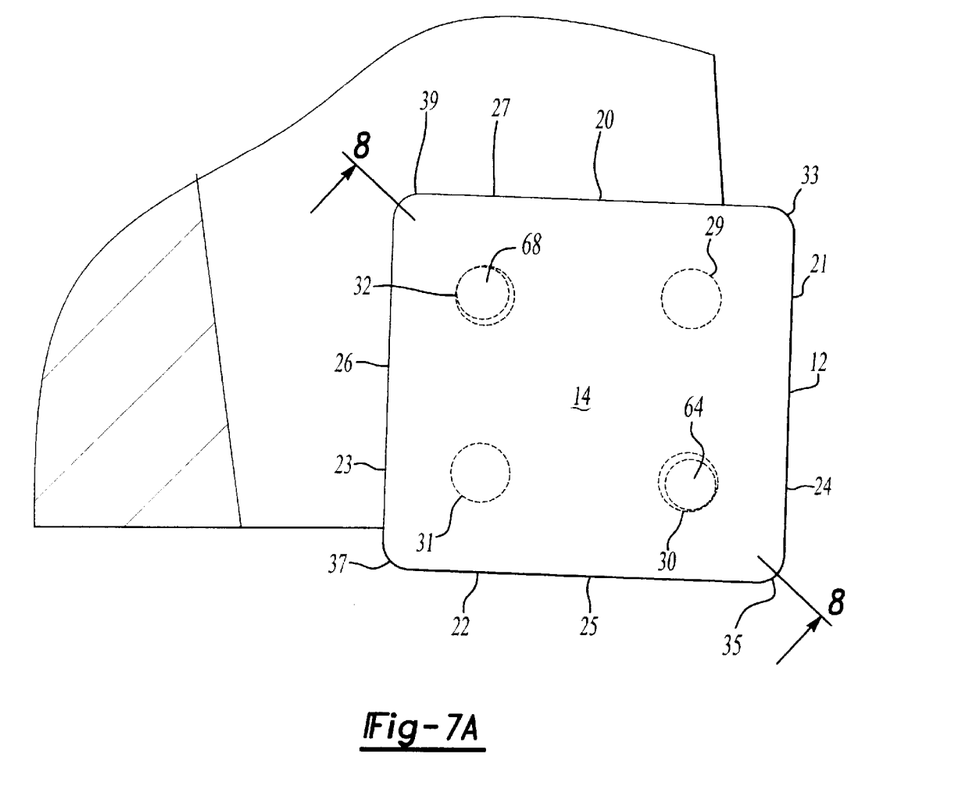
FIG. 7a shows a detail of the insert portion of FIG. 7.
Figure 8:
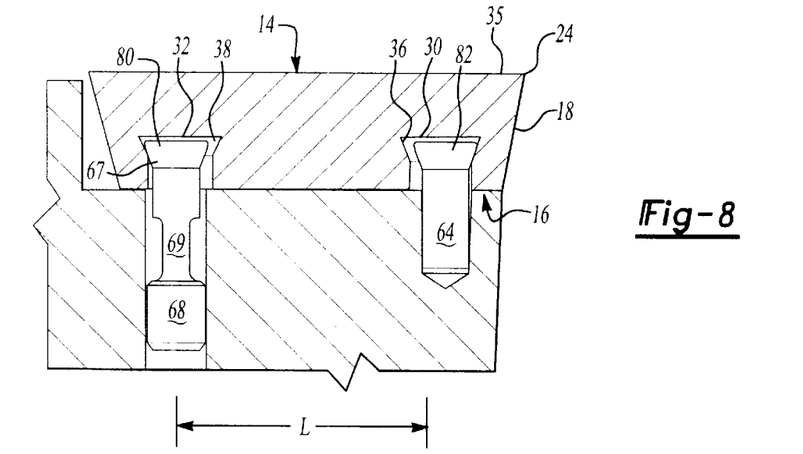
FIG. 8 is a cross sectional view of FIG. 7a taken along the line 8—8 showing the locating units of the present invention.

Another preferred embodiment of the present invention is shown in FIG. 7, where the toolholder 40 is a milling cutter and the insert body 12 is polygonal. The body includes a top surface 14 and a bottom surface 16 that are substantially parallel to each other and connected by a peripheral wall 18 extending therebetween. Optionally, the top and bottom surfaces may be non-parallel. As shown more clearly in FIG. 7A, the peripheral wall 18 is comprised of flanks 20, 21, 22, and 23. Corners 33, 35, 37 and 39 are formed at the intersection of respective pairs of the flanks. The flanks form cutting edges 24, 25, 26 and 27 at the intersection of the flanks with the top surface 14. As shown, corner 35 and its respective cutting edges 24 and 25 are the "active cutting edges", but it will be recognized that other corners may in turn be placed in the active position relative to the toolholder and located as hereinafter described. In this embodiment, the insert locating unit comprises stationary insert locator elements 29, 30, 31 and 32, formed as recesses in the insert body 12. Optionally, the recesses may be modified to through and through holes enabling use of additional cutting edges on the bottom of the insert. Each stationary insert locator element is disposed closely proximate a corresponding corner and the respective cutting edges which intersect thereon. In this embodiment, at least two of the stationary locator elements are matingly engaged with toolholder locator elements during use. As shown more clearly with reference to FIG. 8, the stationary insert locator element 30 closely proximate the active cutting edges 24 and 25 locates the insert by contact between its bearing surface 36 and stationary toolholder locator element 64 bearing surface 82 when the insert is drawn into the toolholder pocket. The insert is drawn into the toolholder pocket by the moveable toolholder locator element and a tensioning device integrally formed in this embodiment as a spring pin 68. The spring pin 68 flexes from side to side. When compressed, the spring pin shank 69 bends thereby reducing the distance "L" between the toolholder locator elements sufficiently to allow mating engagement with the insert locator elements. Releasing the compressive force allows the spring pin to straighten and exert a rearward force on the insert through contact between bearing surfaces 36 and 80, as previously described herein. The rearward movement abuts bearing surfaces 36 and 82 thereby locating the insert. An additional feature of this embodiment is forces perpendicular to the insert receiving seat 46 generated by the pins that can make additional holding means unnecessary. Near the bottom surface 16, bearing surfaces 36 of the insert are substantially perpendicular to the insert bottom surface, forming a columnar portion of the insert stationary locator elements 30 and 32. At a selected distance inward from the bottom surface 16 of the insert, bearing surfaces 36 angle away from the longitudinal axis of insert stationary locator elements 30 and 32 thereby forming a frustroconical portion 38 terminating at floors 34. The bearing surfaces 80 and 82 of the toolholder locator elements are provided with similar frustroconical portions adapted to matingly engage stationary insert locator elements 30 and 32. The bearing surfaces 36 of the insert stationary locator elements 30 and 32 are modified to form wedges that translate force from the tensioning device into vertical and horizontal vector components that draw the insert into the pocket and against the insert receiving seat 46.

Figure 9:
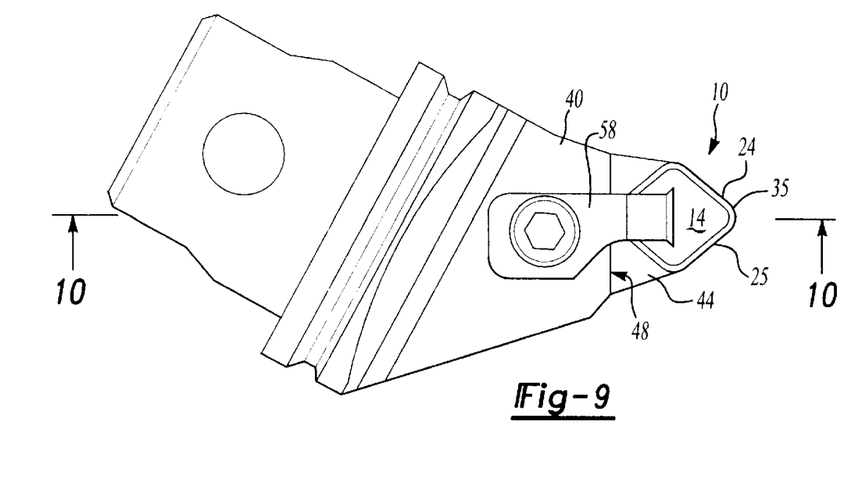
FIG. 9 shows a fourth embodiment of a cutting insert and toolholder according to the present invention in top plan view.
Figure 10:
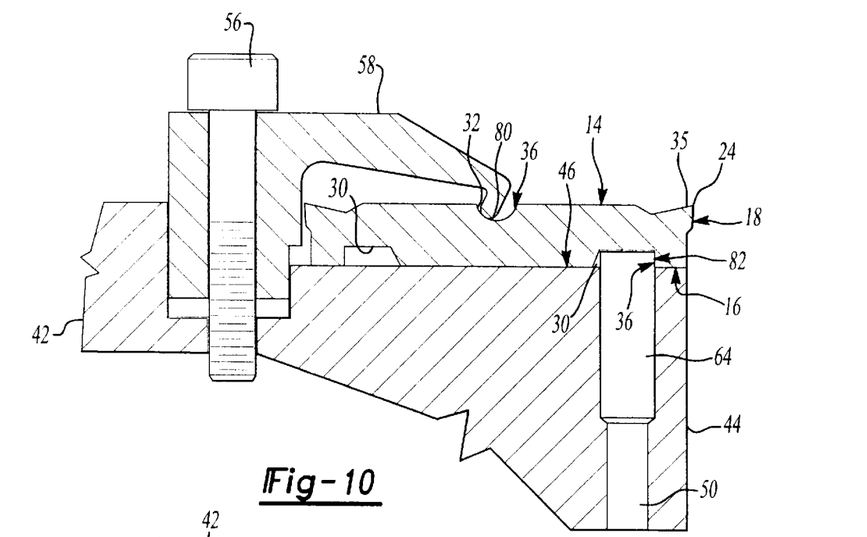
FIG. 10 is a cross-sectional view of the cutting insert of FIG. 9, viewed along a line shown by arrows 10—10.

FIGS. 9 and 10 show another embodiment of the present invention having a modified insert locating unit and a modified toolholder locating unit. The polygonal insert 10 is positioned in the insert receiving region 44 of toolholder 40 with corner 35 located to perform cutting actions on a workpiece. Cutting edges 24 and 25 are positioned to function as the active cutting edges. Stationary insert locator elements 30 are disposed on bottom surface 16 in a manner similar to the first embodiment so as to reduce the distance between the stationary locator element 30 matingly engaged with the stationary toolholder locator element 64 and cutting edges 24 and 25 in "active" position. A stationary insert locator element 32 is disposed on top surface 14. Stationary insert locator element 32 extends into insert body 12 and has a curved bearing surface 36. In an alternative embodiment, stationary insert locator element 32 has planar bearing surfaces and terminates in a floor within insert body 12. Stationary toolholder locator element 64 is disposed in a bore 50 positioned on the distal end of insert receiving seat 46 close to cutting edges 24 and 25 to be located. Stationary toolholder locator element 64 has bearing surfaces 82 for locating the insert, and thereby the cutting edges, thereagainst. Clamp 58 and screw 56 function as the movable toolholder locator element and tensioning device in this embodiment acting to locate the insert 10 against stationary locator element 64. Clamp 58 has a bearing surface 80 for contacting bearing surface 36 of stationary insert locator element 32 when screw 56 is actuated. The downward force created by actuation of screw 56 is transmitted to bearing surface 80 through clamp 58. In a manner known in the art, contact between bearing surfaces 36 and 80 translates the downward force into vector components in the downward and rearward direction, rearward meaning in a direction which tends to move the insert in the plane of the insert receiving seat and toward the toolholder body. These downward and rearward vector components act on the insert to cause abutment of bearing surfaces 82 and bearing surfaces 36 of insert stationary locator element 30 proximate cutting edges 24 and 25. It will be understood that the insert may be indexed to bring other cutting edges into active position and the stationary insert locator element proximate those cutting edges will then be used to locate the insert as previously described.

An additional benefit of the invention is shown in FIGS. 9 and 10: the versatile shape of the toolholder pocket. As shown by the position of sidewall 48, the toolholder is not limited to a particular shape of insert and can use a number of different sizes of insert. A variety of sizes and shapes of inserts according to the invention may be manufactured with stationary locator elements disposed thereon that correspond to the position of locator elements on the toolholder. Further, in this embodiment, different size clamps can also be employed to accommodate different inserts such that the clamp functions as the toolholder movable locator element as described above.

Figure 11:
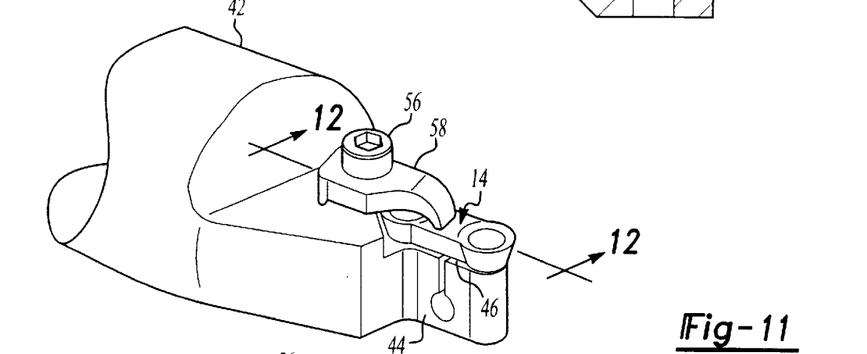
FIG. 11 shows a fifth embodiment of a cutting insert and toolholder according to the present invention in perspective view.
Figure 12:
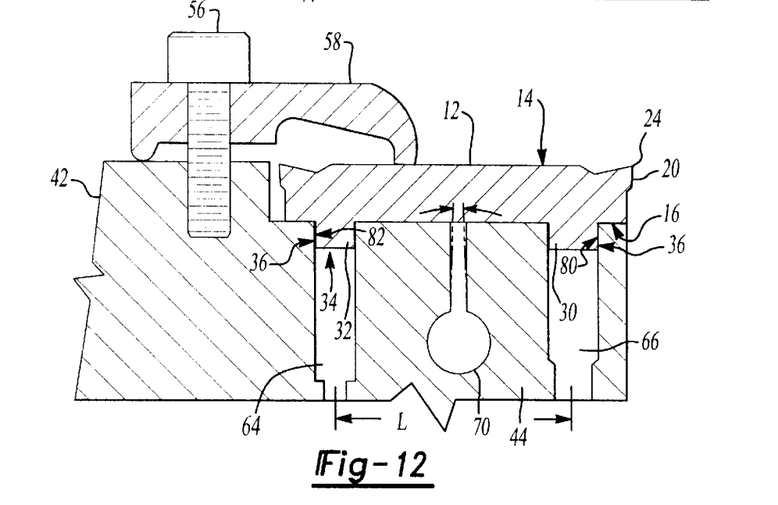
FIG. 12 is a cross-sectional view of the cutting insert of FIG. 11, viewed along a line shown by arrows 12—12.

FIGS. 11 and 12 show an alternative embodiment of the invention wherein insert stationary locator elements 30 and 32 protrude from bottom surface 16 and the toolholder locating unit is modified to matingly engage the protrusions. This embodiment is preferred for use with small inserts and toolholders, where the inelastic nature of the insert protrusions improves reliability of location. Insert receiving region 44 has an insert receiving seat 46, and an integral tensioning device 70. The insert receiving seat 46 is penetrated by stationary toolholder locator element 64 and movable toolholder locator element 66, in the form of bores, having bearing surfaces 82 and 80, respectively. The toolholder locator elements extend substantially orthogonal to insert receiving seat 46, but may optionally be disposed at other angles, as previously described herein. Insert stationary locator elements and 32 have bearing surfaces 36, which terminate in floors 34, for contacting bearing surfaces 80 and 82, respectively. The insert locator elements 30 and 32 extend from bottom surface 16 substantially orthogonal thereto, but may extend at angles corresponding to the α and β angles of the toolholder bores.

Tensioning device 70 allows slight non-permanent deformation of the insert receiving region 44, in response to deactuating force exerted on the tensioning device, and may be a flexing slot or similar device known in the art. The deactuating force exerted on the tensioning device need only be sufficient to temporarily change the distance "L" between the toolholder locator elements thereby allowing mating engagement of insert stationary locator elements 32 and 30 with stationary toolholder locator element 64 and movable toolholder locator element 66, respectively. In this embodiment, the deactuating force causes the movable toolholder locator element 66 to move slightly further away from the stationary toolholder locator element 64. When the deactuating force is released, tensioning device 70 actuates causing the movable toolholder locator element 66 to move closer to the stationary toolholder locator element 64 bringing bearing surface 36 of the movable locator element 66 and bearing surface 80 of insert stationary locator element into abutment thereby locating the insert.

EXAMPLES

Example 1

A turning insert of commercial grade cemented carbide and a steel toolholder according to the second embodiment of the present invention was tested in machining 356 Aluminum at speed 1500 SFM, feed 0.010–0.030 "FPR, depths of cut 0.010–0.200". The insert style was a turning insert as shown in FIGS. 1 and 2, having 0.171 inch diameter recesses in the insert and a toolholder having two steel pins, to matingly engage the recesses, the rearward pin being a spring pin. The distance "d" between the insert flank and the recess as 0.078 inches. The insert was located on the toolholder by deactuating the spring pin, matingly engaging the toolholder pins with the insert recesses and actuating the spring pin. the spring pin head then moved rearward causing engagement of bearing surfaces on the insert recesses and toolholder pins. Initially, a clamp and screw holding device was used to secure the insert. The insert was observed in use and no displacement of the insert was noted. Thereafter, the holding device was removed and machining operations including turning, facing, backfacing and grooving were performed to test the limitation of the six degrees of freedom of movement of the insert. Surprisingly, despite having no holding device in place, the insert retained its location on the toolholder and produced an acceptable part finish. No fracture or chipping of the recesses was noted.

Example 2

The indexability tolerances of a cutting insert and toolholder according to the present invention were compared to conventional locating means. An insert of commercially available grade cemented carbide as shown in FIGS. 1 and 2 was the selected geometry in a comparison test with a prior art insert of the same geometry. The prior art insert was located using conventional means, by abutting the flank of the insert on the opposite end of the insert from the active cutting edge with the toolholder pocket sidewall. The insert of the present invention was located according to the second embodiment. The prior art insert active cutting edge was located to within a tolerance of ±0.001 inches. The insert of the invention was located to within a tolerance of ±0.00025 inches, an improvement of 300%. The results of testing showed that inserts of the present invention exhibit improved tolerances compared to prior art inserts of the same geometry.

It is intended that the specification and examples be considered as exemplary only. Other embodiments of the invention, within the scope and spirit of the following claims will be apparent to those of skill in the art from practice of the invention disclosed herein and consideration of this specification. All documents referred to herein are incorporated by reference hereby.

What is claimed is:

1. A cutting tool comprising:
    (a) a toolholder having an insert receiving region,
    (b) a replaceable cutting insert securable within the region, the replaceable insert having a body defined by a top surface, a bottom surface, at least one flank extending therebetween, and at least one cutting edge formed by intersection of at least a portion of a flank and one of the top and bottom surfaces,
    (c) a first locating unit disposed on at least one of the top and bottom surfaces of the insert body and comprising a stationary insert locator element proximate each cutting edge,
    (d) a second locating unit disposed in the insert receiving region, the second locating unit comprising at least one stationary toolholder locator element adapted to matingly engage a stationary insert locator element so that at least one cutting edge is located as an active cutting edge, each of the stationary locator elements comprising a bearing surface, (e) a tensioning device for urging into abutment the bearing surfaces on stationary insert locator elements and stationary toolholder locator elements which are matingly engaged, whereby the relative location of the toolholder and the active cutting edges is determined by said abutment of bearing surfaces.

2. The cutting tool according to claim 1 wherein the first locating unit further comprises a second insert stationary locator element and the tensioning device comprises a toolholder movable locator element for engaging the second insert stationary locator element.

3. The cutting tool according to claim 2 wherein the cutting edges are on the top surface, the stationary insert locator element and the second insert stationary locator element are on the bottom surface.

4. The cutting tool according to claim 2 wherein the cutting edges and the second insert stationary locator element are on the top surface and the stationary insert locator element is on the bottom surface.

5. The cutting tool according to claim 4 wherein the insert receiving region further comprises an insert receiving seat for contact with the bottom surface and the toolholder stationary locator element is disposed on the insert receiving seat.

6. The cutting tool according to claim 1 wherein the replaceable insert further comprises a plurality of cutting edges.

7. The replaceable insert according to claim 6 wherein at least one cutting edge is formed by intersection of a flank and the top surface and at least one cutting edge is formed by intersection of a flank and the bottom surface.

8. The replaceable insert according to claim 7 wherein the insert locating unit further comprises a second insert stationary locator element in each of the top and bottom surfaces adapted for engagement with the tensioning device.

9. A toolholder for holding a replaceable cutting insert, the replaceable insert defined by a body having a top surface, a bottom surface, at least one flank extending therebetween, at least one cutting edge formed by intersection of at least a portion of a flank and one of the top and bottom surfaces and an insert locating unit disposed on at least one of the top and bottom surfaces and comprising an insert stationary locator element proximate each cutting edge, the toolholder comprising:

(a) a toolholder body comprising an insert receiving region comprising a toolholder locating unit for matingly engaging the insert locating unit so that at least one cutting edge is located as an active cutting edge, the toolholder locating unit comprising a toolholder stationary locator element having a bearing surface for abutting a bearing surface of an insert stationary locator element;

(b) a tensioning device for abutting the bearing surfaces of the toolholder stationary locator element and the insert stationary locator element of the matingly engaged toolholder locating unit and insert locating unit whereby relative location of the toolholder and the active cutting edges is determined by said abutting of bearing surfaces.

10. The toolholder according to claim 9 wherein the tensioning device further comprises a toolholder movable locator element for urging abutting contact of the bearing surfaces of the matingly engaged tool holder locating unit and insert locating unit.

11. The toolholder according to claim 10 wherein the insert receiving region further comprises an insert receiving seat for contact with the bottom surface and the toolholder stationary locator element is disposed on the insert receiving seat.

12. The toolholder according to claim 11 wherein the toolholder movable locator element is disposed on the insert receiving seat.

13. The toolholder according to claim 11 wherein the toolholder movable locator element engages a second insert stationary locator element disposed on the top surface.

14. A replaceable cutting insert of hard wear resistant material releasably securable in a toolholder, the tool holder having an insert receiving region including a toolholder locating unit comprising at least one toolholder stationary locator element having a bearing surface, the insert comprising:

(a) top and bottom surfaces, (b) at least one flank extending therebetween, (c) at least one cutting edge formed by intersection of the at least one flank and at least one of the top and bottom surfaces, (d) an insert locating unit the insert locating unit disposed on one of the top and bottom surfaces and comprising an insert stationary locator element proximate each cutting edge adapted to matingly engage the toolholder stationary locator element so that at least one cutting edge is located as an active cutting edge, (e) the insert stationary locator element having a bearing surface for abutting contact with the bearing surface of the toolholder stationary locating element whereby the active cutting edge is located relative to the toolholder by abutting contact of the bearing surfaces of the matingly engaged insert stationary locator element and toolholder stationary locating element.

15. The replaceable insert according to claim 14 wherein the insert locating unit further comprises a second insert stationary locator element adapted for engagement with a tensioning device of a toolholder to urge abutting contact of the bearing surfaces.

16. The replaceable insert according to claim 15 wherein the insert stationary locator element is disposed on the bottom surface.

17. The replaceable insert according to claim 16 wherein the second insert stationary locator element is disposed on the bottom surface.

18. The replaceable insert according to claim 16 wherein the second insert stationary locator element is disposed on the top surface.

19. The replaceable insert according to claim 14 wherein at least one cutting edge is formed by intersection of a flank and the top surface and at least one cutting edge is formed by intersection of a flank and the bottom surface.

20. The replaceable insert according to claim 19 wherein the insert locating unit further comprises a second insert stationary locator element in each of the top and bottom surfaces adapted for engagement with a tensioning device of a toolholder to urge abutting contact of the bearing surfaces of the matingly engaged toolholder stationary locating element and insert stationary locator element.

* * * * *